L. W. CHUBB.
CIRCUIT INTERRUPTING SYSTEM.
APPLICATION FILED NOV. 29, 1915. RENEWED DEC. 13, 1916.

1,270,785. Patented July 2, 1918.

WITNESSES:
R. J. Fitzgerald.
J. H. Procter.

INVENTOR
Lewis W. Chubb.
BY
Chesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CIRCUIT-INTERRUPTING SYSTEM.

1,270,785.      Specification of Letters Patent.      Patented July 2, 1918.

Application filed November 29, 1915, Serial No. 64,155. Renewed December 13, 1916. Serial No. 136,811.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Circuit-Interrupting Systems, of which the following is a specification.

My invention relates to circuit-interrupting systems, and it has for its object to provide means for automatically precluding the flow of current in a circuit, upon the occurrence of predetermined conditions, without opening the circuit.

It is well known that, if four equal reactors—two condensive and two inductive—are arranged to constitute a resonant square, and if constant potential is impressed across one diagonal of the square, constant current may be obtained in a circuit that is connected across the other diagonal of the square. I utilize this principle, which is commonly known as the mono-cyclic square, for the purpose of precluding the flow of current in a circuit after the current has reached a predetermined value. A spark gap is connected across the constant-current terminals of the mono-cyclic square and so adjusted that the constant-current terminals are short-circuited when the current traversing the constant-potential circuit has reached a predetermined value. After the constant-current terminals are short-circuited, the potential across the same and the current that traverses the constant-potential circuit are reduced substantially to zero.

Another form of my invention utilizes the principle that the potential impressed across a portion of a resonant circuit varies in accordance with the current traversing the circuit. Thus, if a spark gap is connected in shunt relation to either the condenser or the reactor of a resonant circuit and is adapted to short circuit the same, under predetermined conditions, the condition of resonance will be upset, and the other portion of the resonant circuit will prevent the current from flowing.

Figure 1:
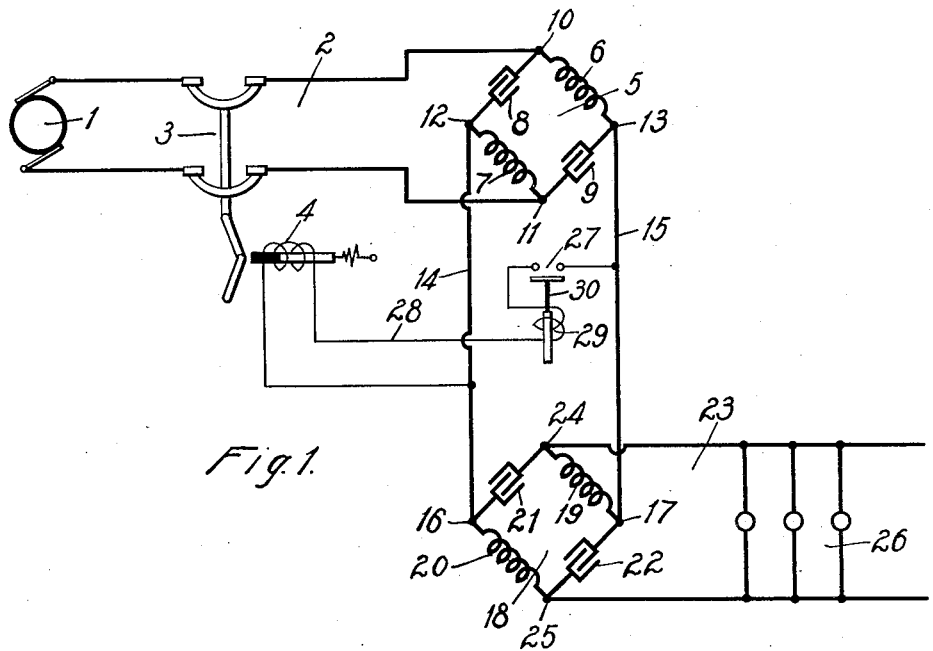
Figure 2:
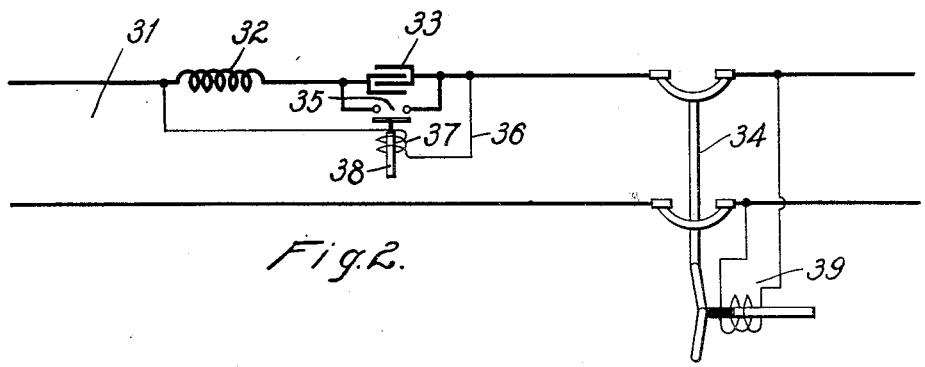

Figure 1 of the accompanying drawings illustrates an electric circuit embodying my invention, and Fig. 2 illustrates an electric circuit embodying a modified form of my invention.

In Fig. 1 of the drawings, an alternating-current generator 1 supplies current of a substantial constant potentiality to an electric circuit 2. A circuit interrupter 3 is connected in the circuit 2 and is provided with a trip coil 4 for tripping the same, under predetermined conditions. A mono-cyclic square, comprising two reactors 6 and 7 and two condensers 8 and 9, is connected substantially as shown in the drawing. The reactance of the reactors and that of the condensers are equal. Hence, if the constant-potential circuit is connected between points 10 and 11, constant current may be obtained in a circuit connected across the points 12 and 13. Two conductors 14 and 15 are connected to the points 12 and 13, respectively, and they are also connected to two points 16 and 17 of a second mono-cyclic square 18. The mono-cyclic square 18 is substantially the same as the mono-cyclic square 5, and comprises two reactors 19 and 20 and two condensers 21 and 22 arranged diametrically with respect to each other. A circuit 23 is connected across the points 24 and 25 of the square 18 for the purpose of supplying a load 26 with constant-potential energy.

A spark gap 27 is connected in a circuit 28 that comprises the tripping coil 4, a winding 29 of a short-circuiting relay 30, and the circuit thus constituted is connected across the conductors 14 and 15.

The generator 1 supplies constant-potential energy to the circuit 2 which is converted by the mono-cyclic square 5 to constant-current energy that traverses the conductors 14 and 15. The energy is again converted by the mono-cyclic square 18 to supply the load 26 with constant-potential energy. Thus, when the current that traverses the circuit 23 increases, the current that traverses the circuit 2 and the potential across the conductors 14 and 15, likewise, increases. Hence, if the potential across the conductors 14 and 15 increases to such value that the arc jumps the spark gap 27, the potential across the conductors 14 and 15 and the current that traverses the circuit 2 will be reduced substantially to zero. When current traverses the circuit 28, the short-circuiting relay 30 will be actuated to short-circuit the spark gap 27, and sufficient current will traverse the trip coil 4 to trip the circuit interrupter 3. Thus, the circuit interrupter 3 will be tripped after the current that traverses the circuit 2 has been reduced substantially to zero.

Since the circuit interrupter 3 is not required to interrupt any substantial value of current, it may be relatively small in structure, or it may be entirely omitted. However, it is advisable to short-circuit the spark gap 27 to prevent deterioration thereof.

In Fig. 2 of the drawings, an electric circuit 31 is provided with a reactor 32, a condenser 33 and an interrupter 34. The reactor 32 and the condenser 33 are connected in series relation to one conductor of the circuit and are so proportioned as to be resonant under normal conditions of operation.

A spark gap 35 is connected in shunt relation to the condenser 33, and a circuit 36 comprising the winding 37 of a relay 38 is connected in shunt relation to the reactor and the condenser. The relay 38 is adapted to short circuit the spark gap 35 under predetermined conditions.

The circuit interrupter 34 is provided with a no-voltage tripping magnet 39 that is connected to the circuit 31.

Since the reactor 32 and the condenser 33 are in voltage resonance, the potential impressed upon the winding 37 is normally substantially zero. However, the potential across the spark gap is proportional to the current traversing the circuit 31. Hence, if a sufficiently great overload traverses the circuit 31 to cause a spark to jump the spark gap 35, the condition of resonance will be upset and the reactor 32 will tend to choke the current down and thereby decrease the potential of the circuit 31. Since the trip coil 39 is operative upon the reduction in voltage in the circuit, the circuit interrupter 34 will be tripped when relatively no current traverses the same. Consequently, the circuit interrupter 34 may be relatively small and inexpensive or entirely omitted. When the condition of resonance is upset, sufficient current traverses the winding 37 to effect short-circuiting of the spark gap 35, thereby preventing injury thereto because of the persistence of the arc.

While I have shown my invention in its simplest forms, it will be understood that various modifications may be made therein, both as to structure and application, without departing from the spirit and scope of the invention as set forth in the appended claims.

I claim as my invention:

1. In an electric circuit, the combination with a reactor and a condenser connected therein and adjusted for resonant operation under predetermined conditions, of means responsive to the potential across a portion of the resonant circuit for short circuiting a portion of the circuit to thereby reduce the current traversing the same.

2. In an electric circuit, the combination with a reactor and a condenser connected therein and adjusted for resonant operation under normal conditions of operation, of a spark gap connected in shunt relation to a portion of the resonant circuit and adapted to upset the condition of resonance under predetermined conditions.

3. In a system of distribution, the combination with a resonant section, of a spark gap connected in shunt relation to a portion of said resonant section and adapted to discharge when the current traversing the system exceeds a predetermined value to thereby reduce the current traversing the system.

4. In a system of distribution, the combination with a resonant section, of a spark gap connected in shunt relation to a portion of the said resonant section and adapted to discharge when the current traversing the system exceeds a predetermined value to thereby reduce the current traversing the system, and means for short-circuiting the spark gap under predetermined conditions.

5. In an electric circuit, the combination with a source of constant potential and a constant-potential load circuit, of a constant-current circuit interposed between the source of constant potential and the load circuit, and means for short-circuiting the constant-current circuit when the load on the load circuit exceeds a predetermined value to thereby prevent current from traversing the load circuit.

6. In an electric circuit, the combination with a source of constant potential and a constant-potential load circuit, of a constant-current circuit interposed between the source of constant potential and the load circuit, and a spark gap connected across the constant-current circuit and adapted to short-circuit the same when the current traversing the load circuit reaches a predetermined value.

7. In a system of distribution, the combination with a constant-potential circuit, a constant-current circuit, and a constant-potential load circuit, of means interposed between the circuits for converting constant-potential energy to constant-current energy and for converting constant-current energy to constant-potential energy, and means for short-circuiting the constant-current circuit when the current traversing the load circuit is of a predetermined value to thereby prevent the current from traversing the constant-potential circuit.

8. In an electric system, the combination with a constant-potential circuit, and a constant-current circuit, of a mono-cyclic square so connected between the circuits as to convert constant-potential energy to constant-current energy, and a spark gap so connected across the conductors of the constant-current circuit that the short-circuiting thereof prevents the current from traversing the constant-potential circuit.

9. In an electric system, the combination with a mono-cyclic square for converting constant potential to constant current, of a spark gap operatively connected across the terminal of the mono-cyclic square for so reducing the potential across the square that no current traverses the same.

10. In an electric circuit, the combination with a reactor and a condenser connected therein and adjusted for resonant operation under predetermined conditions, of means responsive to the potential across a portion of the circuit for upsetting the resonant condition when a predetermined current traverses the circuit.

11. In an electric circuit, the combination with a reactor and a condenser connected therein and adjusted for resonant operation under predetermined conditions, of means responsive to the potential across a portion of the circuit for reducing the current traversing the same when the current traversing the circuit has exceeded a predetermined value.

12. In a system of distribution, the combination with a resonant section, of means responsive to the potential across a portion of the resonant section and connected in shunt relation to a portion of the said resonant section for reducing the current traversing the system when it exceeds a predetermined value.

13. In an electric circuit, the combination with a reactor and a condenser connected therein and adjusted for resonant operation under predetermined conditions, of means responsive to the potential across a portion of the circuit for upsetting the resonant condition under predetermined conditions.

14. In an electric circuit, the combination with a reactor and a condenser connected therein and adjusted for resonant operation under predetermined conditions, of means responsive to the potential across a portion of the circuit for short circuiting a portion of circuit under predetermined conditions.

In testimony whereof, I have hereunto subscribed my name this 24th day of Nov. 1915.

LEWIS W. CHUBB.